June 16, 1953  D. R. CRUM  2,641,983
RIDGER
Filed June 11, 1951  2 Sheets-Sheet 1
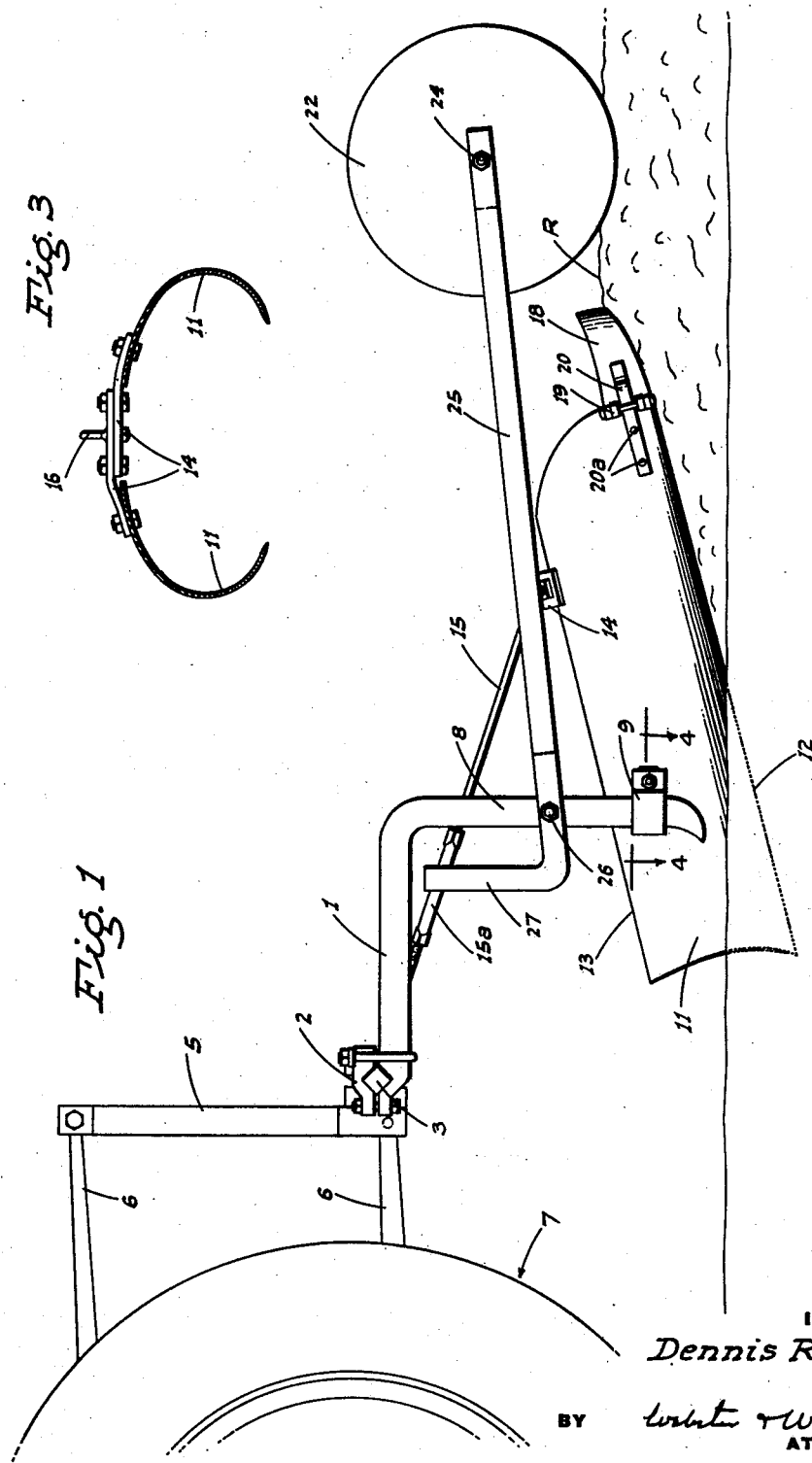
INVENTOR
Dennis R. Crum
BY
ATTORNEYS

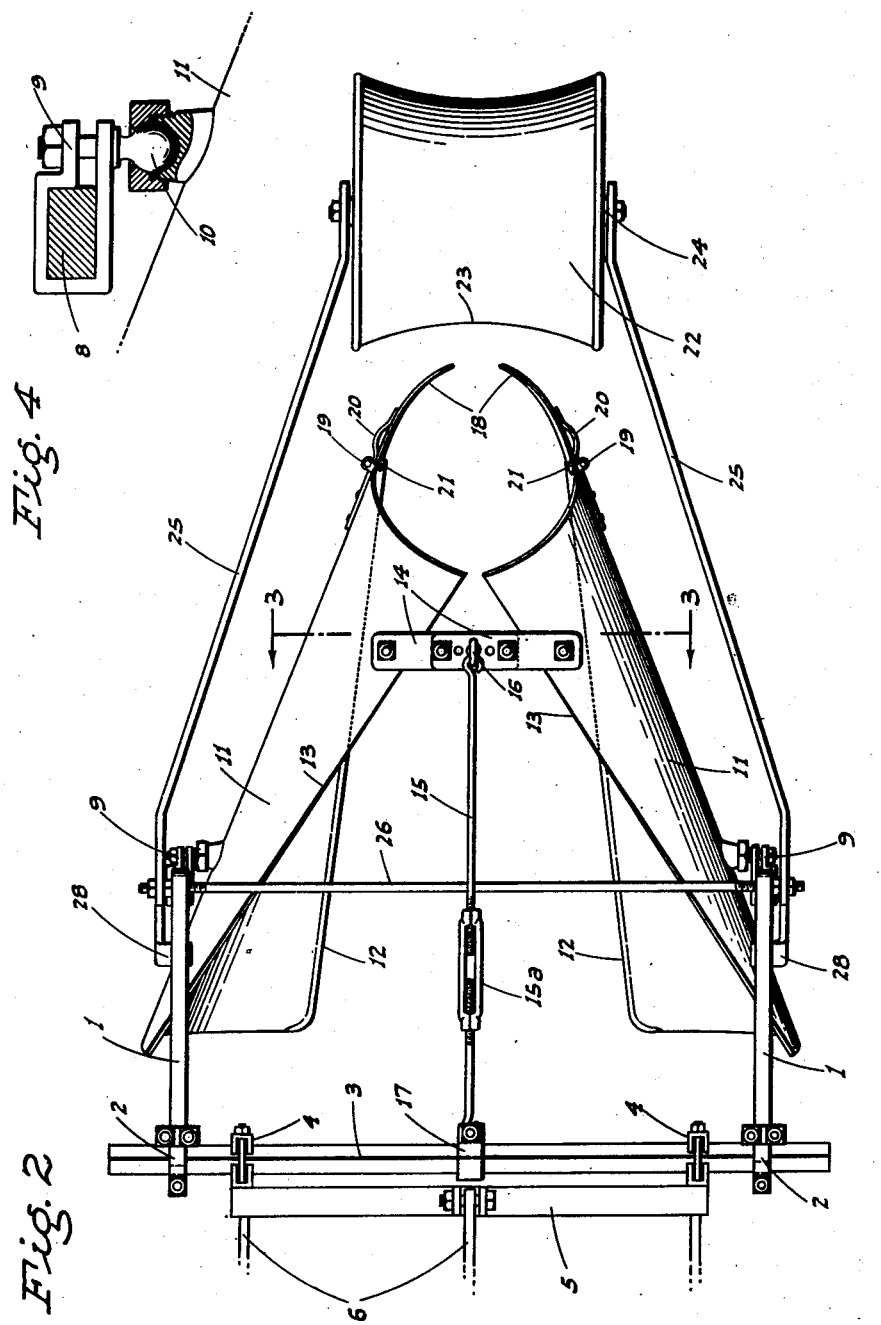

Patented June 16, 1953

2,641,983

UNITED STATES PATENT OFFICE 2,641,983

RIDGER

Dennis R. Crum, Escalon, Calif.

Application June 11, 1951, Serial No. 230,975

2 Claims. (Cl. 97—56)

1

This invention is directed to, and it is a major object to provide, a novel agricultural implement whose purpose is to form ridges, in fields, for the retention of irrigation water in checks.

Another important object of the invention is to provide an implement, as above, which is tractor drawn and operative to form ridges which are well shaped, compact, and mound-like in form.

A further object of the invention is to provide a ridge forming implement which includes a novel shear blade assembly; such assembly being arranged to dig or shear a continuous ribbon of earth from opposite sides of the line of the ridge, and to then roll such sheared earth laterally inwardly to merge and form the moundlike ridge.

An additional object of the invention is to provide each shear blade, at the rear, with a yieldable drag plate which works the corresponding upper portion of the ridge to aid in shaping the same; there being a compacting roller which trails the drag plates, whereby to compact the ridge, and to smooth the same on top.

It is also an object of the invention to provide a ridger which is designed for ease and economy of manufacture; the structure being rugged but simple, and readily coupled in draft relation to a power lift type hitch at the rear of a tractor.

Still another object of the invention is to provide a practical and reliable ridger, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the implement as in use to form a ridge.

Fig. 2 is a top plan view of the implement.

Fig. 3 is a cross section of the shear blade assembly taken on line 3—3 of Fig. 2.

Fig. 4 is a fragmentary enlarged section substantially on line 4—4 of Fig. 1.

Referring now more particularly to the characters of reference on the drawings, the implements comprise a pair of transversely spaced, rearwardly projecting draft arms 1 rigidly attached at their forward ends by clamps 2 to a transverse tool bar 3; the latter being secured by clamps 4 to an upstanding A-frame 5 carried on the power lift type hitch 6 of a tractor, indicated generally at 7.

2

The draft arms 1 are formed, at their rear ends, in integral relation with depending standards 8, such standards being adjustably engaged adjacent their lower ends in clamps 9.

The clamps 9 are attached by ball and socket connections 10 to the outside of a pair of transversely spaced, longitudinally extending shear blades 11; the ball and socket connections 10 being attached to corresponding blades in an above-ground position adjacent but short of the forward ends of said blades.

The shear blades 11 are disposed so that they are upwardly inclined and converge rearwardly from the front; such blades being rolled concave in facing relation, with the concavity increasing in overhang from front to rear so that the lower longitudinal edges 12 have lesser convergence that the upper longitudinal edges 13. The lower longitudinal edges 12 are sharpened and serve as the cutting edges of the blades.

The shear blades 11 are connected at the top and adjacent the rear by transverse spanner bars 14 adjustably connected together in overlapping relation, as shown. By adjusting the effective length of the spanner bars 14, the spacing of the blades can be adjusted as working conditions may require; i. e. to increase or decrease the width of the ridge R which the implement forms.

The assembly of the shear blades 11 is supported, other than by the ball and socket connections 10, by a suspension rod 15 connected between an eye 16 upstanding centrally from the overlapping spanner bars 14, and a clamp 17 on the transverse tool bar 3 centrally of its ends. The suspension rod 15 includes a turnbuckle 15a whereby the shear blade assembly may be adjusted up or down about the ball and socket connections 10.

With the shear blades 11 constructed and supported as described above, such assembly functions as follows:

The blades 11 from their forward and inner corners project in digging relation into the ground on opposite sides of the longitudinal line of the ridge to be formed, and as the tractor advances, such blades shear a continuous ribbon of earth from opposite sides of said line and then roll such sheared earth laterally inwardly so that it merges and forms a moundlike ridge R.

As the ridge is thus formed, it is smoothed and shaped at its upper portion by inwardly curved drag plates 18 which project rearwardly from the rear ends of corresponding shear blades 11 adjacent their lower edges; such drag plates 18 being hinged to said blades 11, as at 19, for outward yielding motion, as when too great a load, or a large clod is engaged. The drag plates 18 are normally held in their working position by leaf springs 20 riveted, as at 20a, to the outside of the blades 11, and extending into engagement with the corresponding sides of said drag plates. The drag plates 18 are prevented from swinging too far inwardly, under the pressure of the springs 20, by means of stops 21. The drag plates 18, while they project rearwardly from the shear blades 11, nevertheless have an upward and rearward incline correresponding substantially to the incline of said blades.

After the ridge R is formed by the blades 11 and drag plates 18, it is smoothed and compacted by a trailing, transverse-axis roller 22 having a concave face 23.

The transverse-axis roller 22 is carried on an axle 24 which is connected between the rear ends of a pair of roller draft arms 25, which arms extend forwardly in diverging relation. Adjacent but short of their forward ends the roller draft arms 25 are pivoted by a cross rod 26 to the standards 8 intermediate the ends of the latter; the roller 22 thus being connected in draft relation to the remainder of the implement, while being capable of up and down floating.

When the implement is lifted off the ground by the power lift type hitch 6, as for turning at the end of the field or for transport, the roller 22 is prevented from falling into ground engagement, by the following arrangement:

At their forward ends the roller draft arms 25 are formed with integral upstanding posts 27 having inturned stops 28 on their upper ends; such stops normally being spaced below the draft arms 1. However, when the implement is raised by the hitch 6 to an elevated or non-working position, the roller 22 lowers to an extent that the stops 28 raise into abutment with the draft arms 1, thus preventing further relative downward motion of said roller.

With the described implement, ridges can be formed rapidly, effectively, and accurately in a field for the purpose of the retention of irrigation water in checks; the ridges as formed by the implement being well shaped and compact.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A ridger comprising a supporting frame which includes a pair of transversely spaced standards and a cross bar from which the standards depend, a pair of shear blades extending rearwardly from between the standards in converging relation, connecting means between the standards and the outer face of the blades adjacent the front of the latter arranged to allow of upward swinging of the blades relative to the standards, a spanner member connecting the blades at the top and adjacent the rear thereof, and a longitudinally adjustable suspension element connecting the member and cross bar and extending at an upward angle to its forward end.

2. A ridger as in claim 1, with means to adjust the length of the spanner member transversely of the ridger whereby to alter the angle of convergence of the blades relative to each other; said blade connecting means being ball and socket joints.

DENNIS R. CRUM.

References Cited in the file of this patent

UNITED STATES PATENTS

| Number | Name | Date |
| --- | --- | --- |
| Re. 2,808 | Chandler | Dec. 3, 1867 |
| 997,384 | Fowler | July 11, 1911 |
| 1,329,375 | Collins | Feb. 3, 1920 |
| 1,514,039 | Dreger | Nov. 4, 1924 |
| 1,557,035 | Dost | Oct. 13, 1925 |
| 1,671,939 | Smith | May 29, 1928 |
| 2,286,305 | Priestley | June 16, 1942 |
| 2,582,503 | Oehler | Jan. 15, 1952 |